United States Patent
Shin

(10) Patent No.: US 11,172,788 B2
(45) Date of Patent: Nov. 16, 2021

(54) LADLE AND ROBOT HAVING THE SAME

(71) Applicant: LG ELECTRONICS INC., Seoul (KR)

(72) Inventor: Changeui Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 16/592,109

(22) Filed: Oct. 3, 2019

(65) Prior Publication Data

US 2020/0029742 A1 Jan. 30, 2020

(30) Foreign Application Priority Data

Sep. 10, 2019 (KR) ........................ 10-2019-0112307

(51) Int. Cl.
- A47J 43/28 (2006.01)
- B25J 15/04 (2006.01)
- B25J 9/16 (2006.01)
- B25J 15/00 (2006.01)

(52) U.S. Cl.
CPC ........... A47J 43/281 (2013.01); B25J 9/1612 (2013.01); B25J 15/0019 (2013.01); B25J 15/0408 (2013.01)

(58) Field of Classification Search
None
See application file for complete search history.

(56) References Cited

U.S. PATENT DOCUMENTS

| | | | | |
|---|---|---|---|---|
| 222,549 | A * | 12/1879 | Tureblood | A61J 7/0023 30/326 |
| 233,185 | A * | 10/1880 | Baker | A61J 7/0023 30/326 |
| 812,312 | A * | 2/1906 | Ward | A61J 7/0023 30/326 |
| 1,367,568 | A * | 2/1921 | Smith | A47G 19/16 99/323 |
| 2,259,504 | A * | 10/1941 | Wilson | G01F 19/002 73/426 |
| 2,691,877 | A * | 10/1954 | Frolich | A47G 19/303 401/12 |
| 2020/0015623 | A1* | 1/2020 | Kim | B25J 9/0096 |
| 2020/0029742 | A1* | 1/2020 | Shin | A47J 43/281 |
| 2020/0298306 | A1* | 9/2020 | Kullar | B25J 9/102 |

FOREIGN PATENT DOCUMENTS

KR   10-2012-0009373 A   2/2012

* cited by examiner

Primary Examiner — Hwei-Siu C Payer
(74) Attorney, Agent, or Firm — Birch, Stewart, Kolasch & Birch, LLP

(57) ABSTRACT

The ladle includes a ladle body including a main body having a handle and a space for containing food, a flexible guide having a connection end connected with an upper portion of the main body, and a deformer to change a shape of the flexible guide such that an angle of a top surface of the flexible guide is varied.

20 Claims, 20 Drawing Sheets

LADLE AND ROBOT HAVING THE SAME

CROSS-REFERENCE TO RELATED APPLICATIONS

This application claims the benefit of priority to Korean Patent Application No. 10-2019-0112307, filed in the Korean Intellectual Property Office on Sep. 10, 2019, the entire contents of which are incorporated herein by reference.

FIELD OF THE DISCLOSURE

The present disclosure relates to a ladle and a robot having the same.

A ladle, which is an appliance used to ladle a soup, a liquid or the like, has a recessed bottom and a long rod.

The ladle may be mainly used to move food in a kitchen or a restaurant, and be preferably formed in the shape capable of minimizing the food from overflowing.

An example of a ladle capable of minimizing the overflow of the food may be a ladle having a lid, which is disclosed in Korean Unexamined Patent Publication No. 10-2012-0009373 (Feb. 1, 2012).

The ladle having the lid has the structure in which the lower portion of the ladle is cut, a water-proof material having elasticity is provided to surround the entire portion of an elastic net, a lid is provided to rotate about a hinge shaft formed at one side of the upper portion of the ladle in the vertical direction, and a connecting strap is provided between elastic net and the lid.

In the ladle, when the food is contained inside the elastic net, the elastic net is stretched downward to pull the connecting strap, and the connecting strap allows the lid to be closed.

SUMMARY

In the ladle having the lid according to the related art, when the food is moved out of the ladle, the lid may interrupt the movement of the ladle, and it is difficult for the lid to return to the position for opening the ladle.

The present disclosure is to provide a ladle capable of rapidly carrying the food and easily moving the food to the outside by minimizing the overflow of the food when the food is moved, and a robot having the same.

According to an embodiment of the present disclosure, a ladle may include a ladle body including a main body having a handle and a space for containing food, a flexible guide having a connection end connected with an upper portion of the main body, and a deformer to change a shape of the flexible guide such that an angle of a top surface of the flexible guide is varied.

The flexible guide may have a shape of a disc formed in a center thereof with an opening.

The deformer may change the shape of the flexible guide to a funnel shape in which the flexible guide is widened toward an upper portion of the flexible guide, when the deformer is turned on.

When the deformer is turned on, a top surface of the flexible guide faces above an upper end of the main body.

The deformer may change the shape of the flexible guide to a shape in which a top surface of the flexible guide forms an acute angle with respect to a horizontal plane extending from an upper end of the main body.

For example, the deformer may include a permanent magnet installed in the flexible guide. In addition, the deformer may further include an electromagnet installed on in the handle or the main body to exert attraction force or repulsive force on the permanent magnet. For another example, the deformer may further include a pair of electromagnets that are provided to the flexible guide while being spaced apart from each other and overlapped with each other while interposing the flexible guide therebetween when the pair of electromagnets are turned on. The flexible guide may include a pair of electromagnet installations areas in which the pair of electromagnets are installed, and a folding area positioned between the pair of electromagnet installation areas and folded while being overlapped with each of the pair of electromagnet installation areas when the pair of electromagnets are turned on.

The flexible guide may be formed in one side thereof with an insertion groove and formed on an opposite side thereof with a protrusion inserted into the insertion groove. For another example, the deformer may further include a connecting rod connected with the protrusion, and a motor to pull the connecting rod in a direction that the protrusion is inserted into the connecting rod. The flexible guide may have a section in a major arc.

According to an embodiment of the present disclosure, a ladle including a ladle body including a main body having a handle and a space for containing food and a flexible guide having a connection end connected with an upper portion of the main body; a deformer to change a shape of the flexible guide such that an angle between a top surface of the flexible guide and an upper end of the main body; a robot arm including an end effector, which grips the ladle, to move the end effector; and a controller to control the deformer and the robot arm. The controller may maintain the deformer to be turned on when an end effector of the robot arm moves.

DETAILED DESCRIPTION OF THE PREFERRED EMBODIMENTS

Hereinafter, preferred embodiments of the present disclosure will be described in detail with reference to the drawings.

Figure 1:
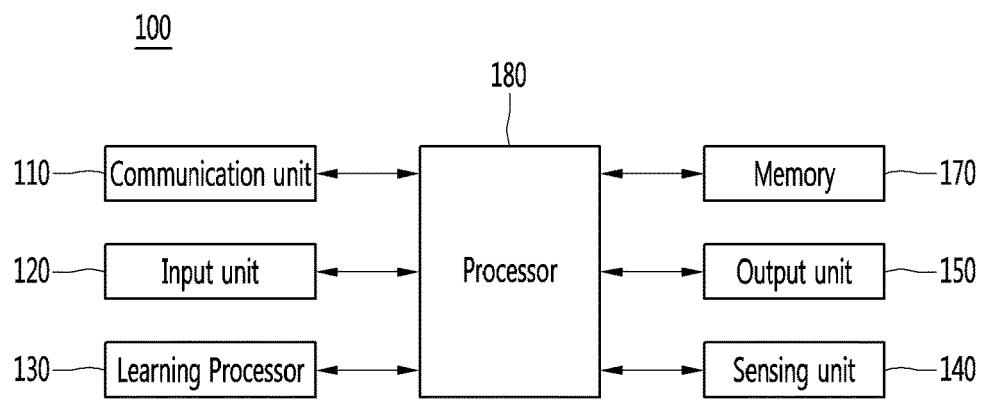
FIG. 1 is a view illustrating an AI device constituting a robot system according to an embodiment.
Figure 2:
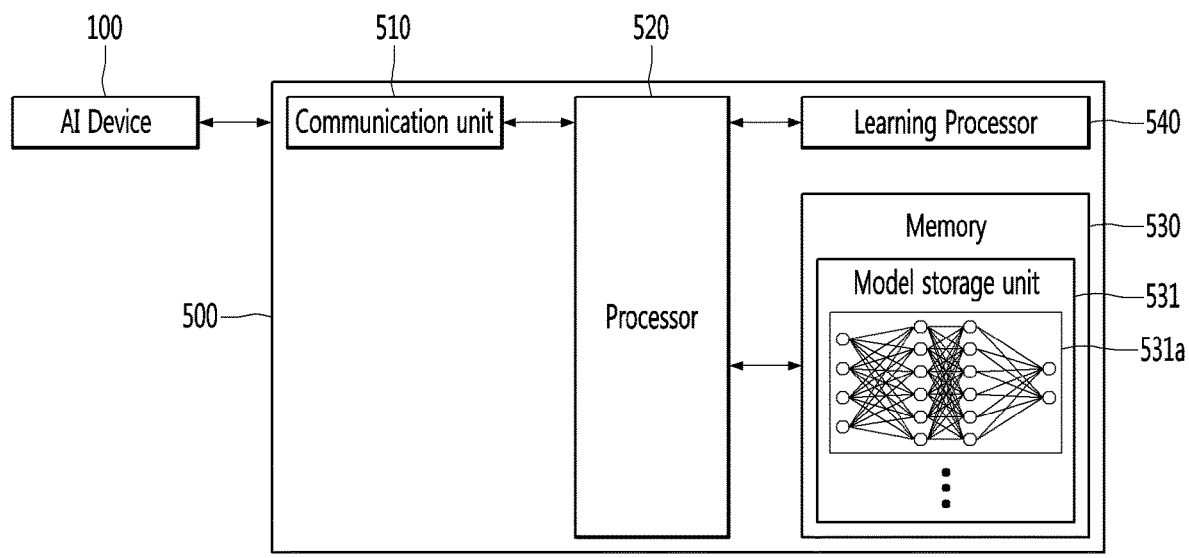
FIG. 2 is a view illustrating an AI server of a robot system according to an embodiment.
Figure 3:
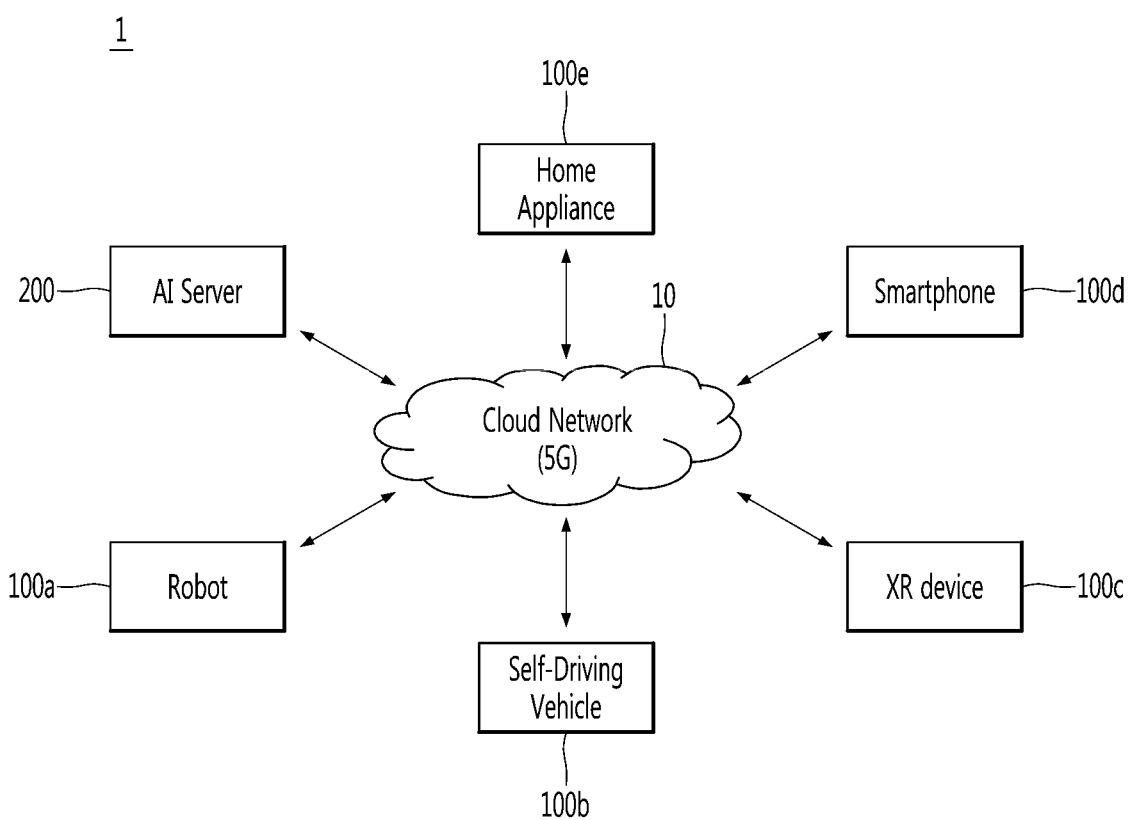
FIG. 3 is a view illustrating an AI system to which a robot system is applied according to an embodiment.

FIG. 1 is a view illustrating an AI device constituting a robot system according to an embodiment, FIG. 2 is a view illustrating an AI server of a robot system according to an embodiment and FIG. 3 is a view illustrating an AI system to which a robot system according to an embodiment is applied.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving unit, and may travel on the ground through the driving device or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication device 110, an input device 120, a learning processor 130, a sensing device 140, an output device 150, a memory 170, and a processor 180.

The communication device 110 may transmit and receive data to and from external devices such as other AI devices 100a to 100e and the AI server 500 by using wire/wireless communication technology. For example, the communication device 110 may transmit and receive sensor information, a user input, a learning model, and a control signal to and from external devices.

The communication technology used by the communication device 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input device 120 may acquire various kinds of data.

At this time, the input device 120 may include a camera for inputting a video signal, a microphone for receiving an audio signal, and a user input device for receiving information from a user. The camera or the microphone may be treated as a sensor, and the signal acquired from the camera or the microphone may be referred to as sensing data or sensor information.

The input device 120 may acquire a learning data for model learning and an input data to be used when an output is acquired by using learning model. The input device 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, o user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

At this time, the output device 150 may include a display device for outputting time information, a speaker for outputting auditory information, and a haptic module for outputting haptic information.

The memory 170 may store data that supports various functions of the AI device 100. For example, the memory 170 may store input data acquired by the input device 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 500 connected to a robot according to an embodiment of the present disclosure.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication device 510, a memory 530, a learning processor 540, a processor 520, and the like.

The communication device 510 can transmit and receive data to and from an external device such as the AI device 100.

The memory 530 may include a model storage device 531. The model storage device 531 may store a learning or learned model (or an artificial neural network 531*a*) through the learning processor 540.

The learning processor 540 may learn the artificial neural network 531*a* by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 530.

The processor 520 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 500, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 500 configuring the AI system 1 may be connected to each other through the cloud network 10. In particular, each of the devices 100a to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving device such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. At this time, the robot 100a may acquire the intention information of the interaction due to the user's operation or speech utterance, and may determine the response based on the acquired intention information, and may perform the operation.

Figure 4:
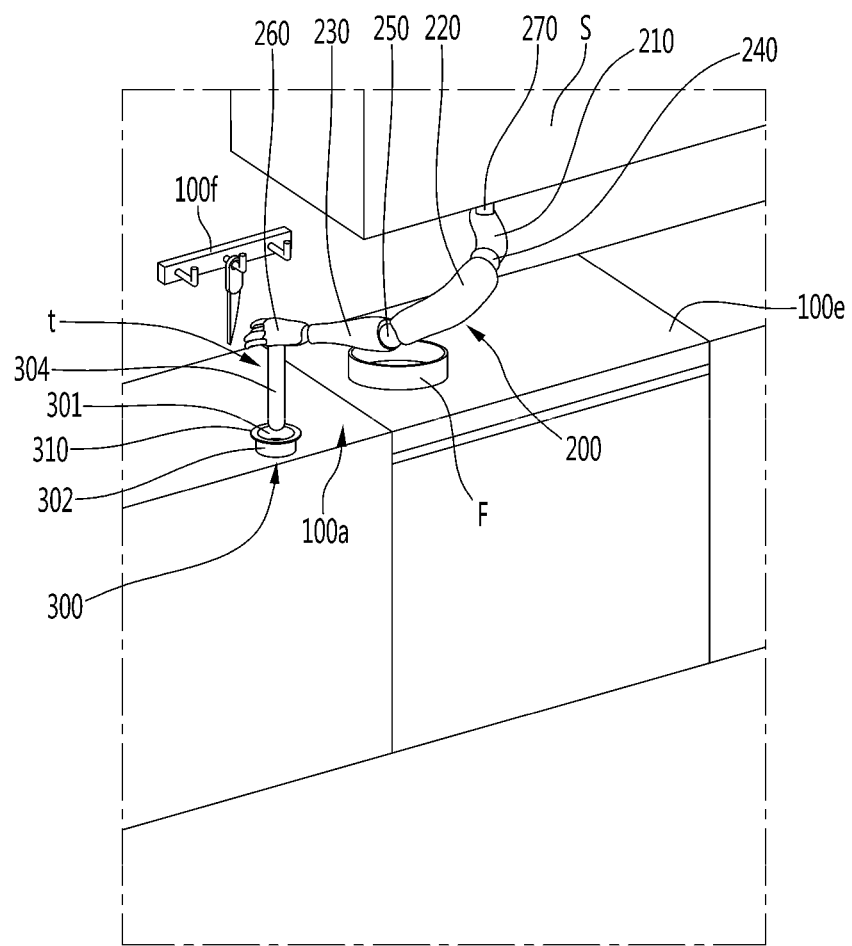
FIG. 4 is a view illustrating a robot having a ladle according to an embodiment of the present disclosure.

FIG. 4 is a view illustrating a robot having a ladle according to an embodiment of the present disclosure.

The robot 100a may include at least one root arm 200.

The robot arm 200 may perform various cooking operations such as moving ingredients or food, cutting the ingredients, or stirring food in the container, by using a kitchen utensils, such as a knife, a cutting board, a pot (cooking container) "F", a ladle "t", or a frying pan, The robot arm 200 may include a plurality of arms 210, 220, and 230 and at least one arm connector 240 or 250 which connects the arms with each other, to perform various cooking operations described above. The arms 210, 220, and 230 may be sequentially arranged while interposing the arm connector 240 or 250 therebetween.

The robot arm 200 may further include an end effector 260 installed in any one of the arms 210, 220, and 230.

The end effector 260 may be a robot hand or a gripper, may be installed in an end of the robot arm 200, and may perform various operations (hereinafter, referred to as a "cooking operation") associated with cooking.

The robot arm 200 may include at least one motor or actuator to rotate the arms 210, 220, and 230, the arm connectors 240 and 250, and the end effector 260.

As long as the robot arm 200 has a configuration capable of three-dimensionally moving or rotating the end effector 260, the robot arm 200 may be variously applied without the limitation in the number or the shape of the arms 210, 220, and 230, and at least one arm connector 240 or 250, motors or actuators.

The robot 100a may further include a robot connector 270 that connects another one 210 of the plurality of arms 210, 220, and 230 to a surrounding object "S".

The surrounding object "S" connected to/supported by the robot connector 270 may be furniture, such as a shelf or a cabinet, around a cooking appliance 100e or a robot body supporting the robot arm 200.

The end effector 260 may move or rotate the ladle "t" three-dimensionally while being connected with the ladle "t", which is an example of a kitchen utensil The ladle "t" may be separately connected with the end effector 260. The robot 100a may include the ladle "t".

The robot 200 may grip the ladle "t", which is positioned on a cradle 100f, such as a shelf or a hanger, for the kitchen utensil, with the end effector 260 or may integrate the ladle "t" with the end effector 260 by fitting the ladle "t" into the end effector 260. The robot arm 200 may perform various cooking operations using the ladle "t" while three-dimensionally moving and rotating the end effector 260.

Hereinafter, the connection between the ladle "t" and the end effector 260 may be defined as the fixing the ladle "t" to the end effector 260, the gripping of the ladle "t" by the end effector 260 or the fitting of the ladle "t" into the end effector 260 such that the ladle "t" is moved or rotated integrally with the end effector 260.

In other words, the robot arm 200 may perform a cooking operation using the ladle "t" as the end effector 260 gripping the ladle "t" is moved or rotated.

The robot 100a may perform various cooking operations using the ladle "t" around the cooking appliance 100e, the cradle 100f for the kitchen utensil, or a table, or may move the ladle "t" after putting food, which is contained in the cooking container "F", into the ladle "t".

Preferably, when the food is carried, the ladle "t" is configured to prevent the food from overflowing as much as possible.

The ladle "t" may include a ladle body 300 and a flexible guide 310.

The ladle body 300 may include a main body 302 having a main body 302 formed therein with a space 301 for containing food and a handle 304 may be provided to the main body 302.

The main body 302 may have the shape of a container having an open top surface. The food may be contained in the space 301 of the main body 302.

The handle 302 may be provided at one side of the main body 302 to protrude. The handle 302 may protrude to extend upward from the one side of the main body 320 while being inclined upward.

The flexible guide 310 may be connected with the main body 302, and may move together with the main body 302 when the main body 302 is moved.

Figure 5:
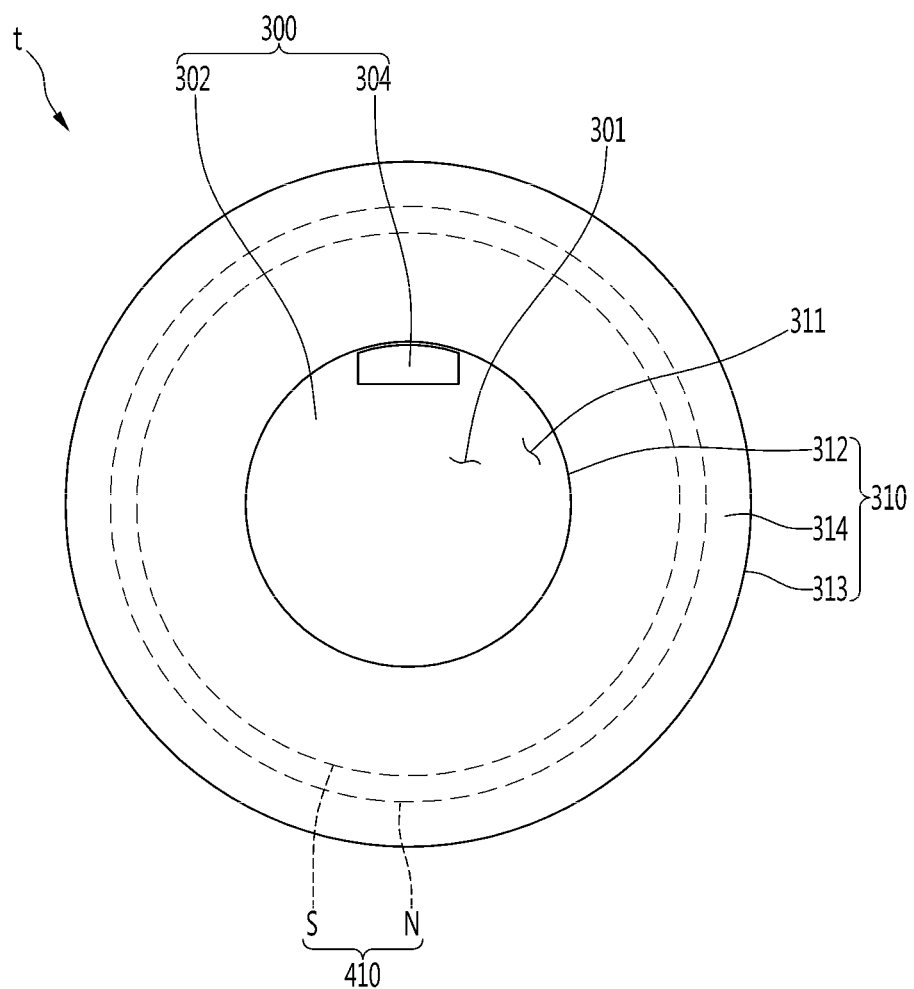
FIG. 5 is a plan view illustrating one example of a ladle according to an embodiment of the present disclosure.
Figure 6:
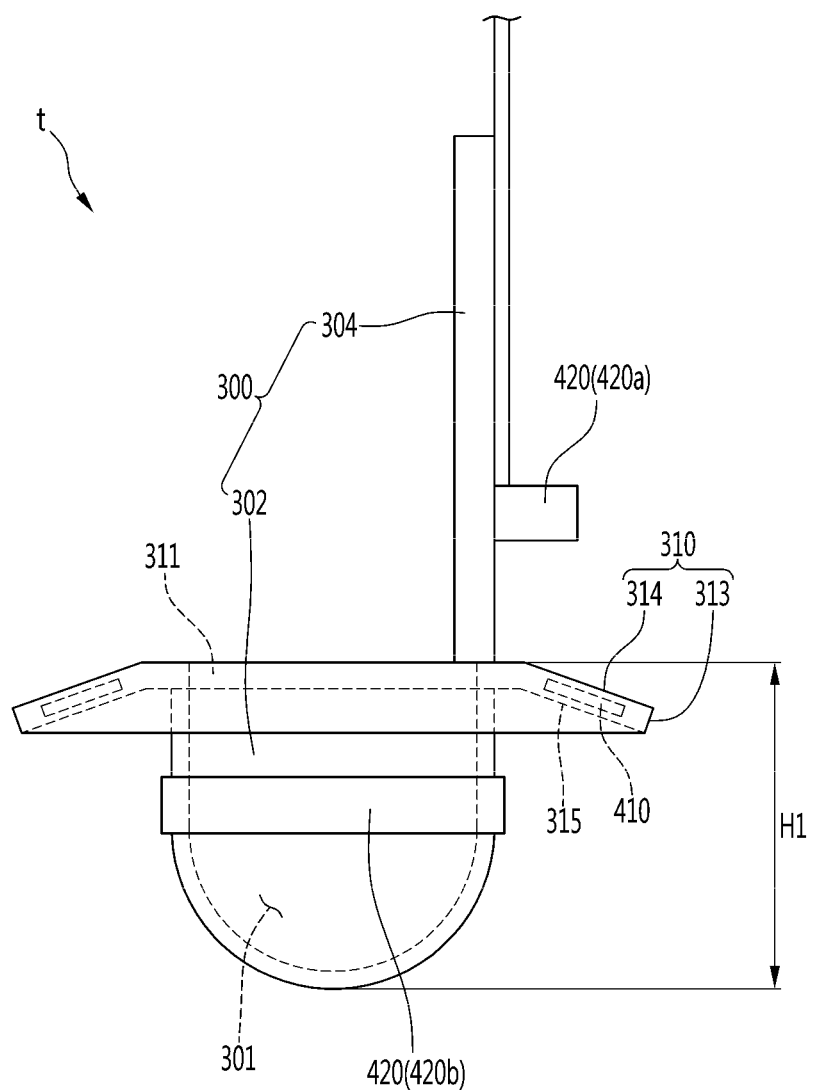
FIG. 6 is a side view of the ladle illustrated in FIG. 5.
Figure 7:
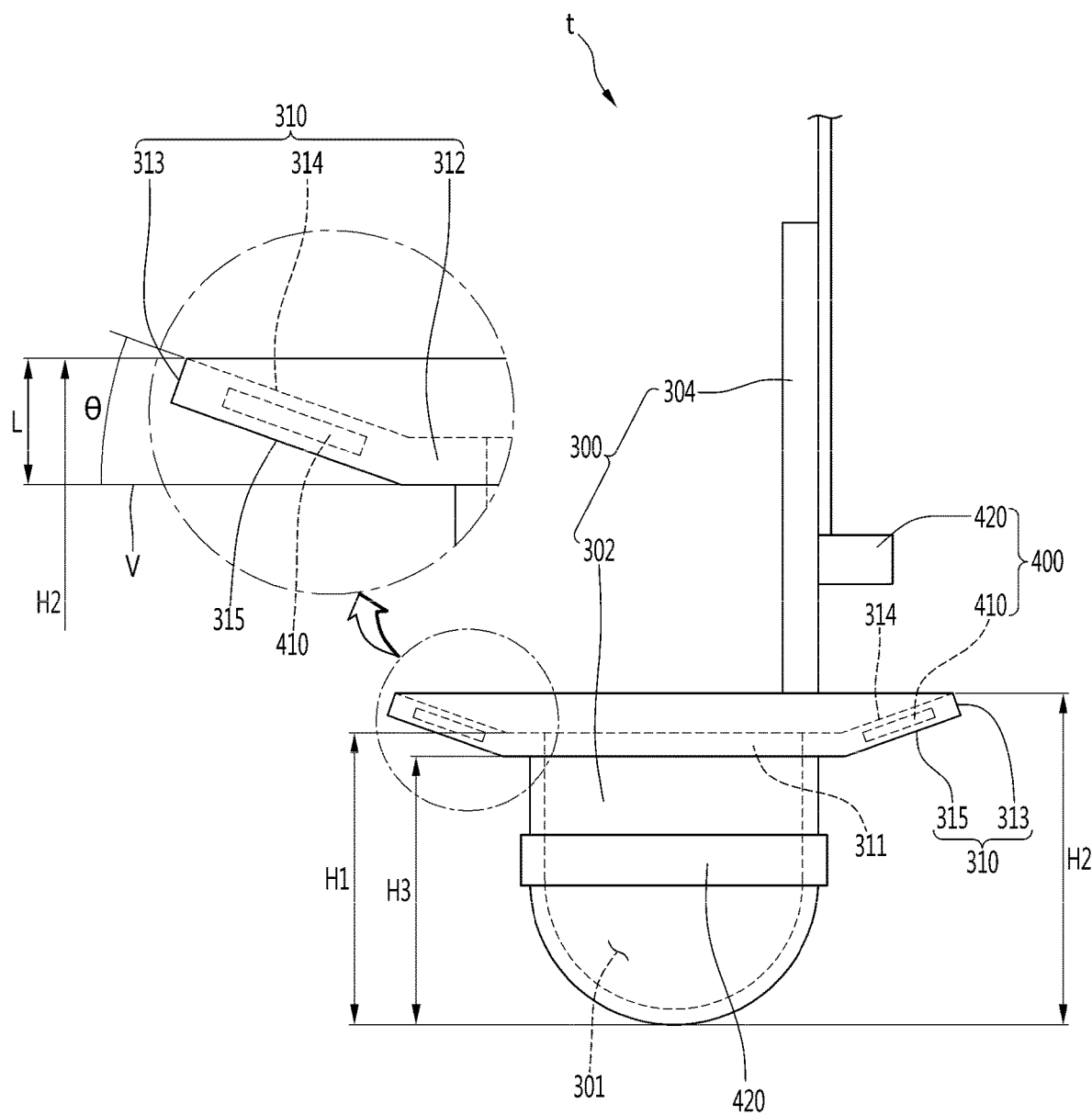
FIG. 7 is a side view illustrating the ladle when the shape of the ladle illustrated in FIG. 6 is changed to minimize the overflow of the food.

FIG. 5 is a plan view illustrating one example of a ladle according to an embodiment of the present disclosure, FIG. 6 is a side view of the ladle illustrated in FIG. 5, and FIG. 7 is a side view illustrating the ladle when the shape of the ladle illustrated in FIG. 6 is changed to minimize the overflow of the food.

The flexible guide 310 may include a connection end 312 connected with the main body 302. The connection end 312 may be connected with the upper portion of the main body 302. The connection end 312 may be connected with the upper end of the main body 302 or an upper portion of an outer circumference of the main body 302. The connection end 312 may be connected with the main body 302 as the connection end 312 is fitted into the upper portion of the main body 302, may be attached to the main body 302 by an adhesive, or may be rotatably connected with a hinge shaft.

The flexible guide 310 may be an overflow protector to prevent food, which is escaped from the space 301 of the main boy 302, from overflowing the ladle "t" and flowing down such that the food is dropped down into the space 301 of the main boy 302 again.

The flexible guide 310 may include a free end 313 positioned at an opposite side of the connection end 312.

The flexible guide 310 may be a flexible material, such as silicone, rubber, or the like, that may be curved or bent. For example, the flexible guide 310 may include a synthetic resin.

The flexible guide 310 may be curved or bent at the part thereof between the connection end 312 and the free end 313 in the state that the connection end 312 is connected with the main body 302. The position and the height of the free end 313 may be varied depending on the shape of the flexible guide 310.

The free end 313 is positioned at the same height as the height H1 of the connection end 312 or at a height lower than the height H1 of the connection end 312 or may be positioned at a second height H2 higher than the first height H1 of the connection end 312.

The connection end 312 may be an inner rim of the flexible guide 310 and the free end 313 may be an outer rim of the flexible guide 310.

The flexible guide 310 may have the shape of a disc formed in the center thereof with an opening 311. In other words, the flexible guide 310 may have the shape of a ring or a donut.

The flexible guide 310 may include a top surface 314 and a bottom surface 315 for connecting the connection end 312 with the free end 313.

The flexible guide 310 may be positioned around an upper portion of the main body 302. The flexible guide 310 may be horizontally arranged or may be arranged to surround an outer circumference of the upper portion of the main body 302 as illustrated in FIG. 6.

When the ladle "t" ladles the food up, the flexible guide 310 is preferably provided to have a shape or an angle for easily introducing the food into the space 301.

Meanwhile, when the ladle "t" is moved after the food is contained in the space 301, the flexible guide 310 is preferably provided to have a shape or an angle for gathering the food in the space 301.

Preferably, the flexible guide 310 may be widely spread, may be changed to be in the shape (first shape) of gradually being widened downward while surrounding an outer circumference of the main body 302 as illustrated in FIG. 6, or may be changed to be in the shape (second shape) of gradually being widened upward like the shape of the funnel as illustrated in FIG. 7.

When the flexible guide 310 is in the first shape, the food may be easily introduced into the space 301 of the main body 302.

In this case, the robot arm 200 may ladle up the food contained in the cooking container "F", such as a pot or a frying pan, as the position of the ladle "t" is lowered to a proper height without excessively being lowered.

When the flexible guide 310 in the second shape, the height H2 of the free end 313 may be higher than the height H3 to the upper end of the main body 302, and the flexible guide 310 may be disposed to be inclined at an acute angle θ with respect to the horizontal plane (V), between the connection end 312 and the free end 313 In this case, the top surface 314 of the flexible guide 310 may face above the space 301, and may function as a guide surface to guide the food overflowing the space 301 such that the food is dropped down into the space 301 again.

When the flexible guide 310 is in the second shape, a separate space surrounded by the flexible guide 310 may be formed inside the flexible guide 310, and the sectional shape of the space formed inside the flexible guide 310 may be a trapezoid shape.

The space formed inside the flexible guide 310 may be positioned above the space 301 of the ladle body 300, and may receive food together with the space 301 of the ladle body 300.

In other words, the ladle "t" according to the present embodiment may be a volume-variable ladle having a variable size in the whole space for receiving food.

The robot 100a may further include a deformer 400 to change the shape of the flexible guide 310.

The deformer 400 may change the shape of the flexible guide 310. The deformer 400 may be a shape changing mechanism that can elastically change the shape of the flexible guide 310. The deformer 400 may change the shape of the flexible guide 310 such that the angle (8) of the top surface of the flexible guide 310 is varied.

The angle (θ) of the top surface of the flexible guide 310 may be an angle between the horizontal surface "V" and the top surface 314 of the flexible guide 310.

The angle (8) of the top surface of the flexible guide 310 and the height H2 of the free end 313 may be determined by the shape of the flexible guide 310 and the thickness "L" of the flexible guide 310 in a vertical direction.

When the flexible guide 310 is changed to the shape in which the thickness "L" of the flexible guide 310 is increased in the vertical direction, the top surface of the flexible guide 310 may have a steep slope and the height H2 of the free end 313 may be increased.

As the deformer 400 is installed in the ladle "t", the deformer 400 may constitute a portion of the ladle "t". In addition, as the deformer 400 is installed in the robot arm 200 instead of the ladle "t", the deformer 400 may constitute a portion of the robot arm 200. In addition, as the deformer 400 is installed in the cooking container F, the deformer 400 may be installed in a portion of the cooking container F.

When the deformer 400 constitutes a portion of the ladle "t", the ladle "t" may include the ladle body 300, the flexible guide 310, and the deformer 400, and the deformer 400 may be installed in at least one of the ladle body 300 and/or the flexible guide 310 to change the shape of the flexible guide 310.

When external force is not exerted on the flexible guide 310, the flexible guide 310 may be formed to be maintained in the first shape as illustrated in FIG. 6. When the external force is exerted on the deformer 400, the flexible guide 310 may be configured such that the shape of the flexible guide 310 is changed to the second shape as illustrated in FIG. 7.

When the deformer 400 is turned on, the top surface 314 of the flexible guide 310 may be changed to be in the shape in which the top surface 314 of the flexible guide 310 faces above the space 301 of the main body 302.

The deformer 400 may change the shape of the flexible guide 310 to a shape in which a top surface 314 of the flexible guide 310 has an acute angle (8) with respect to the horizontal plane "V" extending in the horizontal direction from an upper end of the main body 302.

The deformer 400 may change the shape of the flexible guide 310 to the shape of a funnel widened upward as illustrated in FIG. 7 when the deformer 400 is turned on.

For example, the deformer 400 may include a permanent magnet 410 installed in the flexible guide 310. The permanent magnet 410 may have an N pole "N" and an S pole "S", and may be installed to be embedded inside the flexible guide 310 or in the bottom surface of the flexible guide 310.

For example, the deformer 400 may further include an electromagnet 420 installed in the handle 304 or the main body 302 to exert attraction force or repulsive force on the permanent magnet 410. The electromagnet 420 may receive a current through a wire or a terminal provided in the robot arm 200 and may exert attraction force or repulsive force to the permanent magnet 410 when the current is applied to the electromagnet 420.

A single electromagnet 420 may be installed to apply magnetic force to the permanent magnet 410 or not to apply the magnetic force to the permanent magnet 410.

The deformer 400 may include a pair of electromagnets 420A and 420B, and the pair of electromagnets 420A and 420B may selectively apply magnetic force to the permanent magnet 410.

One 420a of the pair of electromagnets 420a and 420b may be installed in the handle 304 in proximity to the permanent magnet 410 and may apply attraction force to the S pole S of the permanent magnet 410.

A remaining one 420b of the pair of electromagnets 420a and 420b may be installed in the main body 302 to be close to the permanent magnet 410, and may apply attraction force to the N pole N of the permanent magnet 410

The pair of electromagnets 420a and 420b may be selectively turned on. When any one of the electromagnets 420a and 420b is turned on, a remaining one of the electromagnets 420a and 420b may be turned off.

Among the pair of electromagnets 420a and 420b, the electromagnet 420a, which pulls the permanent magnet 410 upward, may be an electromagnet which is turned on when the ladle "t" is moved by the robot arm 200.

Among the pair of electromagnets 420a and 420b, the electromagnet 420b, which pulls the permanent magnet 410 upward, may be an electromagnet which is turned on when the ladle "t" is moved by the robot arm 200.

The robot 100a may be controlled by the controller. The robot 100a may constitute the AI device to perform a motion operation, such as a cooking operation, using an artificial neural network. In addition, the robot 100a may generate the motion operation, such as the cooking operation, through the data previously stored in the memory 170 and the program of the processor 180. Hereinafter, for the convenience of explanation, the controller will be assigned with "180" which is the same reference numeral as that of the processor.

The controller 180 may control the deformer 400 and the robot arm 200. The controller 180 may maintain the deformer 400 to be turned on when the end effector 260 of the robot arm 200 is moved.

The controller 180 may turn on an electromagnet 420a of pulling the permanent magnet 410 upward to change the flexible guide 310 to be in the shape of a funnel as illustrated in FIG. 7, before performing the cooking operation of variously changing the position of the ladle "t". When the electromagnet 420a is turned on, the shape of the flexible guide 310 may be changed to the second shape, and the controller 180 may control the robot arm 200 such that the end effector 260 moves the position of the ladle "t".

The controller 180 may maintain the electromagnet 420a to be turned on to pull the permanent magnet 410 upward while the ladle "t" is continuously moved by the end effector 260.

The controller 180 may turn on the electromagnet 420a to pull the permanent magnet 410 upward so as to prevent the food from being easily escaped from the ladle "t", when the movement of the ladle "t" by the end effector 260 is completed. The controller 180 may turn on the electromagnet 420b to pull the permanent magnet 410 downward.

The deformer 400 illustrated in FIGS. 5 to 7 is a component to change the shape of the flexible guide 310 using magnetic force, and may include a magnetic substance formed of a metal material to which magnetic force may be applied instead of the permanent magnet 410.

Figure 8:
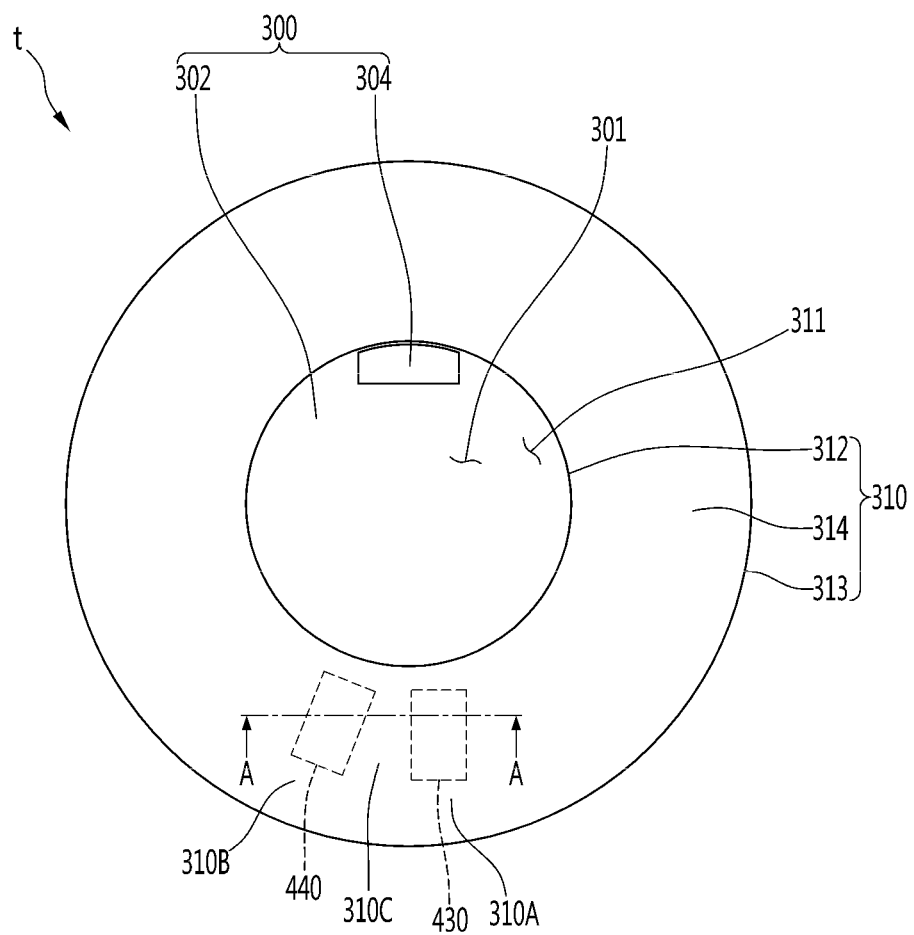
FIG. 8 is a plan view illustrating another example of a ladle, according to an embodiment of the present disclosure.
Figure 9:
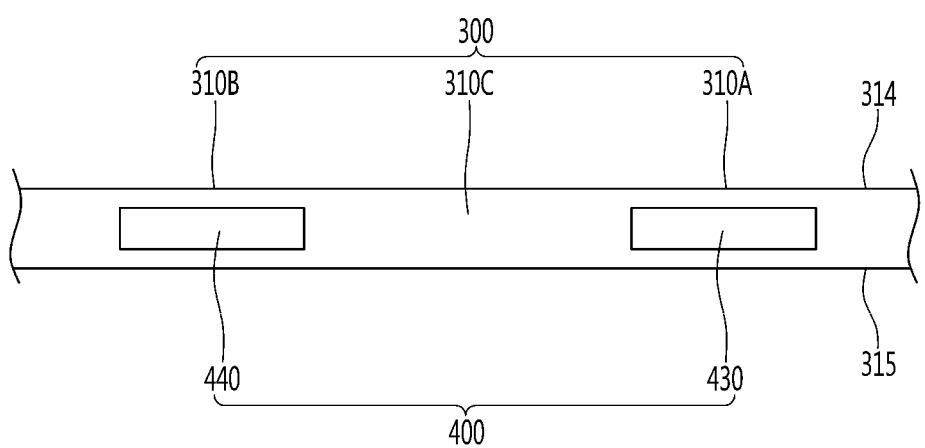
FIG. 9 is a cross-sectional view taken along line A-A illustrated in FIG. 8.
Figure 10:
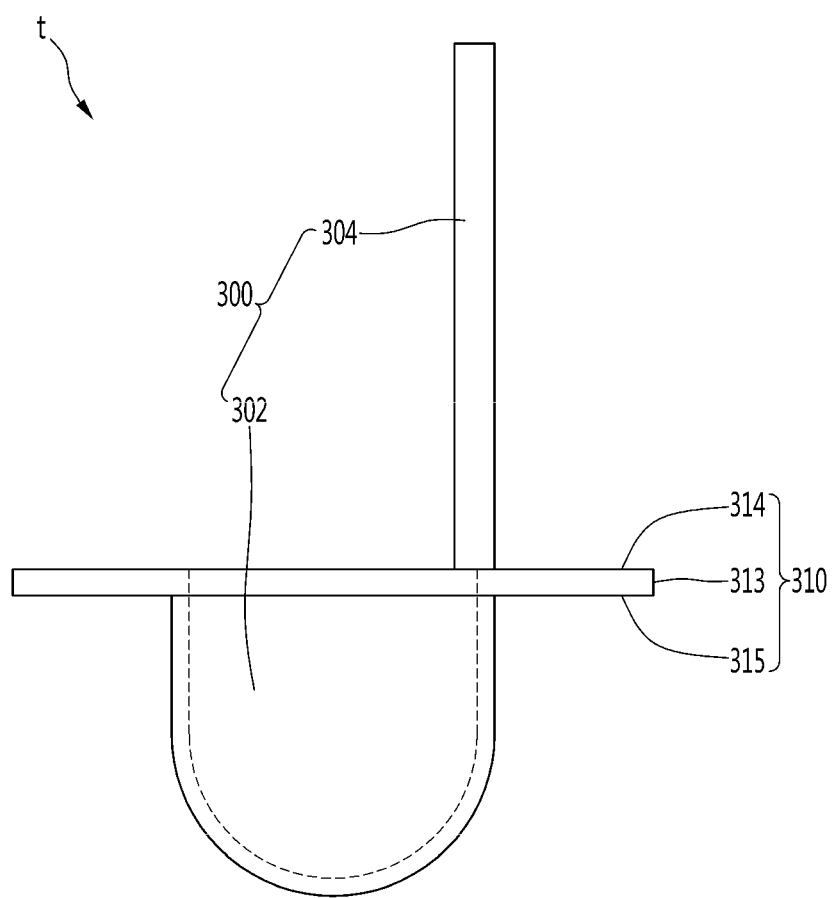
FIG. 10 is a side view of the ladle illustrated in FIG. 8.

FIG. 8 is a plan view illustrating another example of a ladle, according to an embodiment of the present disclosure, FIG. 9 is a cross-sectional view taken along line A-A illustrated in FIG. 8, and FIG. 10 is a side view of the ladle illustrated in FIG. 8.

Figure 11:
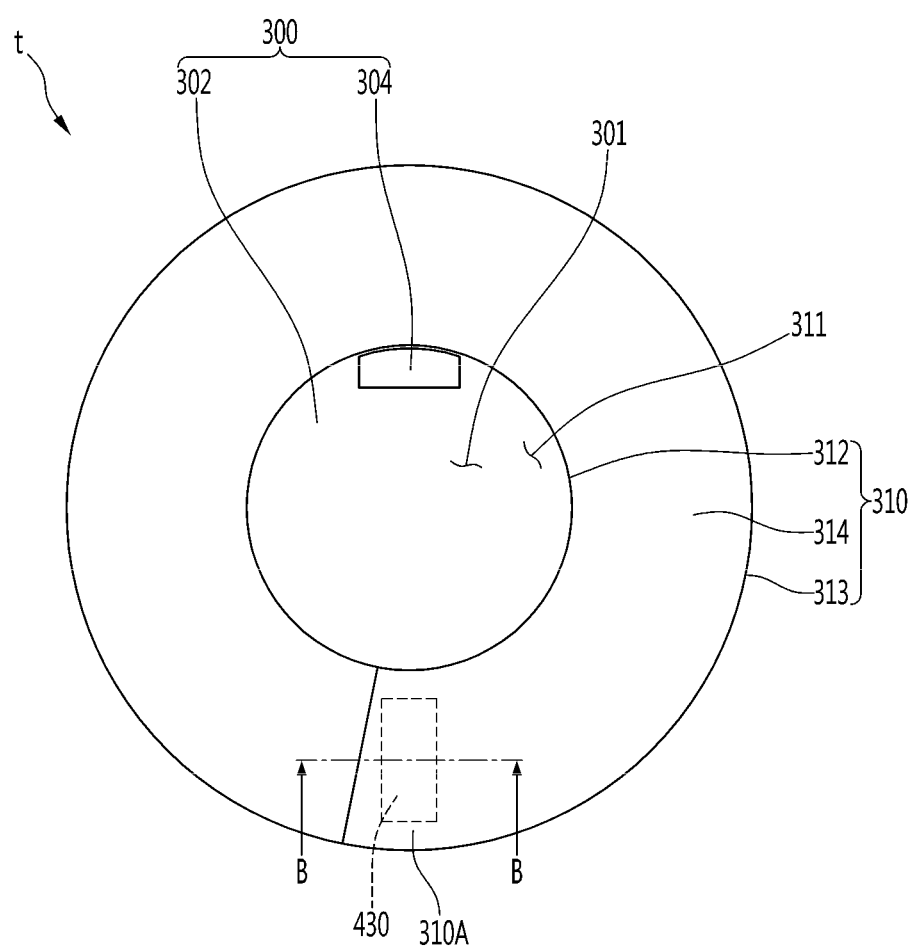
FIG. 11 is a plan view when the ladle illustrated in FIG. 8 is changed in shape such that the overflow of the food is minimized.
Figure 12:
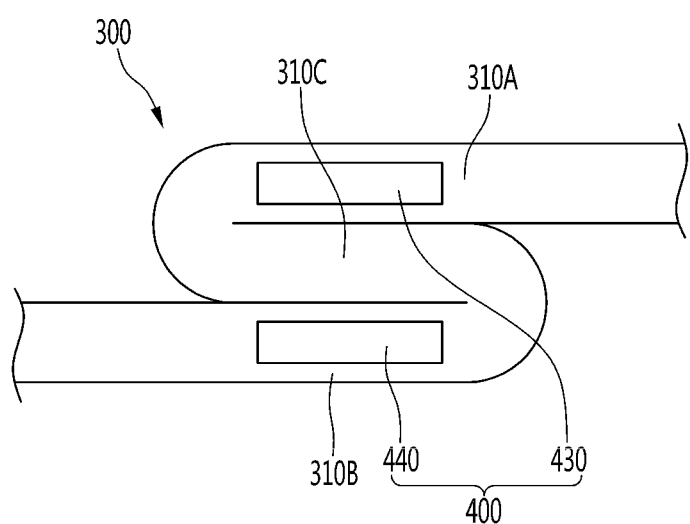
FIG. 12 is a cross-sectional view taken along line B-B illustrated in FIG. 11.
Figure 13:
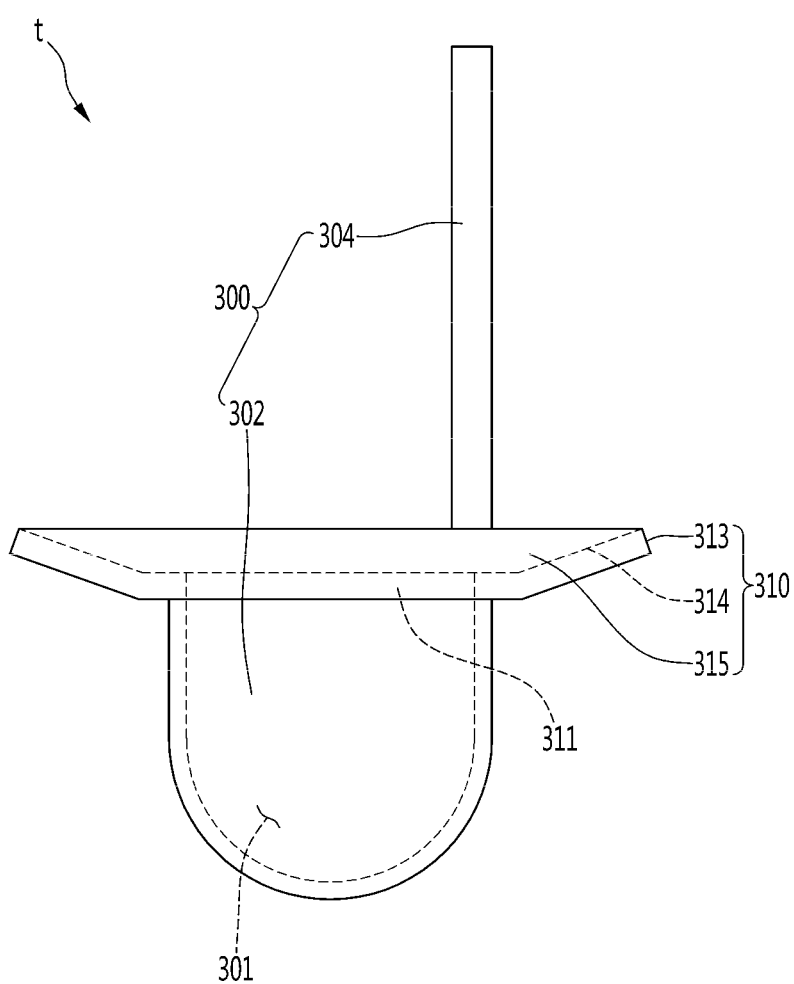
FIG. 13 is a side view of the ladle illustrated in FIG. 11.

FIG. 11 is a plan view when the ladle illustrated in FIG. 8 is changed in shape such that the overflow of the food is minimized, FIG. 12 is a cross-sectional view taken along line B-B illustrated in FIG. 11, and FIG. 13 is a side view of the ladle illustrated in FIG. 11.

The flexible guide 310 illustrated in FIGS. 8 to 13 may be the same as the flexible guide 310 illustrated in FIGS. 5 to 7 in the shape and the material, and a portion of the flexible guide 310 is folded by the deformer 400 as illustrated in FIG. 12 such that the overall shape and the height "L" in the vertical direction may be changed.

The flexible guide 310 illustrated in FIGS. 8 to 14 is different from the flexible guide 310 illustrated in FIGS. 5 to 7 in the manner of modifying the shape, but is the same as the flexible guide 310 illustrated in FIGS. 5 to 7 in other structures and operations.

In the following description made with reference to FIGS. 8 to 13, the same components as those of the flexible guide 310 illustrated in FIGS. 5 to 7 will be assigned with the same reference numerals to avoid the duplication description and the details thereof will be omitted.

The deformer 400 illustrated in FIGS. 8 to 13 may be configured such that some of the flexible guide 310 is folded. When there is no external force, an area between two areas, which are spaced apart from each other, of the flexible guide 310 are folded with respect to the two areas such that the two areas becomes closer to each other.

Such an example of the deformer 400 may include a pair of electromagnet 430 and 440. The pair of the electromagnet 430 and 440 may be provided in the flexible guide 310 while being spaced apart from each other as illustrated in FIGS. 8 and 9. The pair of the electromagnet 430 and 440 may be overlapped with each other while interposes a portion of the flexible guide 310 therebetween as illustrated in FIGS. 11 and 12.

The flexible guide 310 may include a pair of electromagnet installations areas 310A and 310B in which the pair of electromagnets are installed, and a folding area 310C positioned between the pair of electromagnet installation areas 310A and 310B.

The folding area 310C may be folded while being overlapped with each of the pair of electromagnet installation areas 310A and 310B in a vertical direction when the pair of electromagnets 430 and 440 are turned on, as illustrated in FIG. 12.

The pair of electromagnets 430 and 440 may be simultaneously turned on or turned off.

When the pair of electromagnets 430 and 440 are simultaneously turned on, a bottom surface of any one of the pair of electromagnets 430 and 440 and a top surface of a remaining one of the pair of electromagnets 430 and 440 may have opposite poles, respectively. Alternatively, attraction force may be applied to the bottom surface of the any one of the pair of electromagnets 430 and 440 and the bottom surface of the remaining one of the pair of electromagnets 430 and 440. In this case, the shape of the flexible guide 310 may be changed to the shape of a funnel gradually widened upward.

When the pair of electromagnets 430 and 440 are simultaneously turned off, no magnetic force is formed from each of the pair of electromagnets 430 and 440, and the flexible guide 310 may be restored to the original shape thereof by the self-restoring force thereof. In this case, the flexible guide 310 may be restored to be in the shape in which the flexible guide 310 is widely spread, or the shape (the first shape) in which the flexible guide 310 is gradually widened downward while surrounding an outer circumference of the main body 302.

The deformer 400 illustrated in FIGS. 9 to 12 is not limited to be in the structure including a pair of electromagnets 430 and 440, but may be in the structure including one permanent magnet and one electromagnet 430. When the electromagnet 430 is turned on, an installation area for the permanent magnet and an installation area for one electromagnet 430 may be overlapped with each other in the vertical direction while interposing the folding area 310C therebetween, and the flexible guide 310 may be changed to be in the shape of being gradually widened toward.

Figure 14:
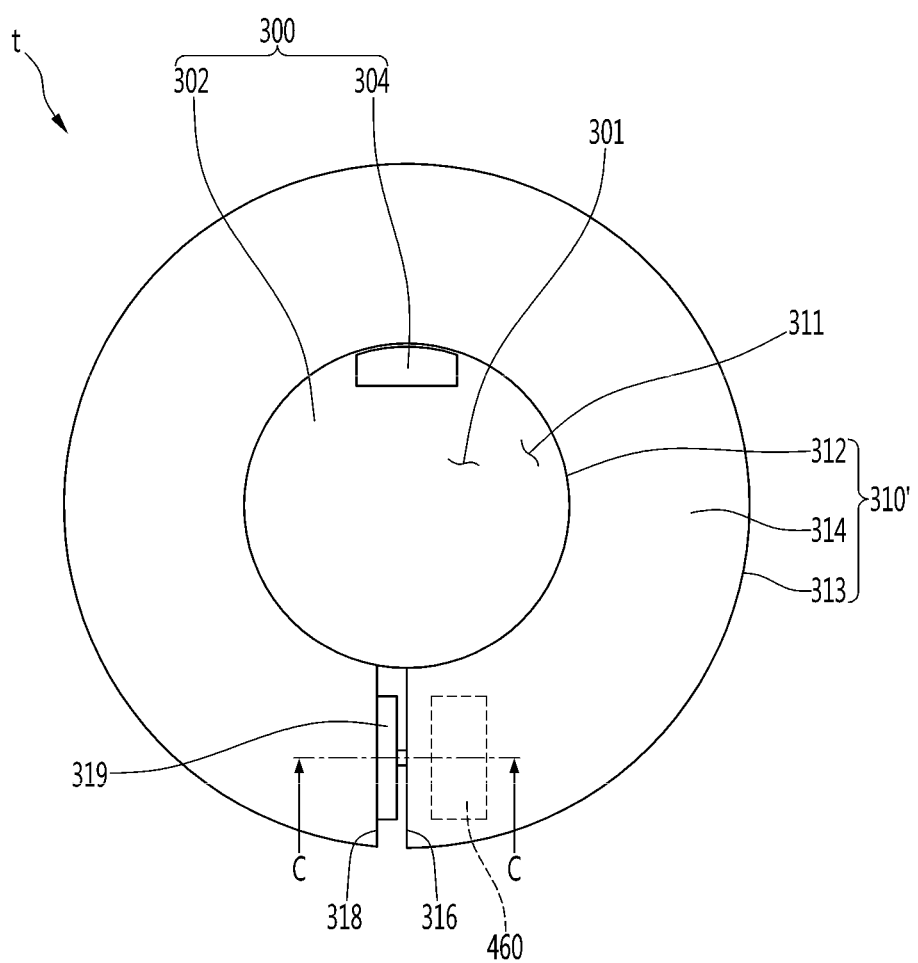
FIG. 14 is a plan view illustrating another example of a ladle, according to an embodiment of the present disclosure.
Figure 15:
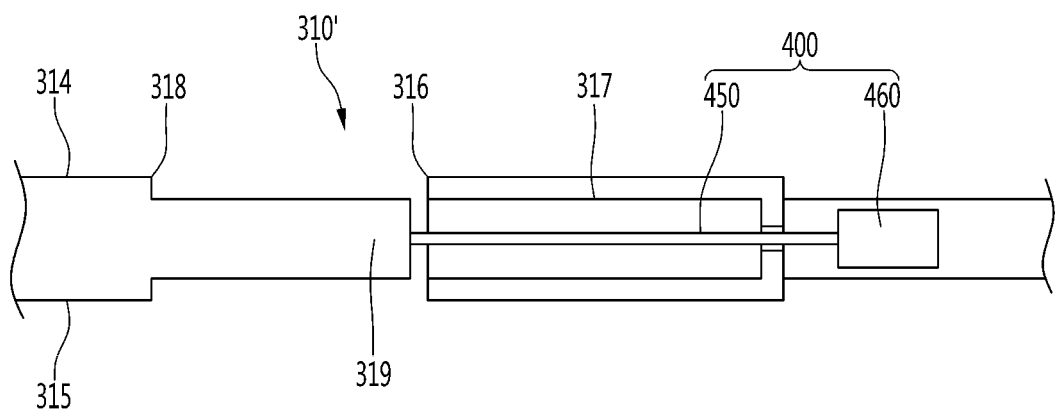
FIG. 15 is a sectional view taken along line C-C illustrated in FIG. 14.
Figure 16:
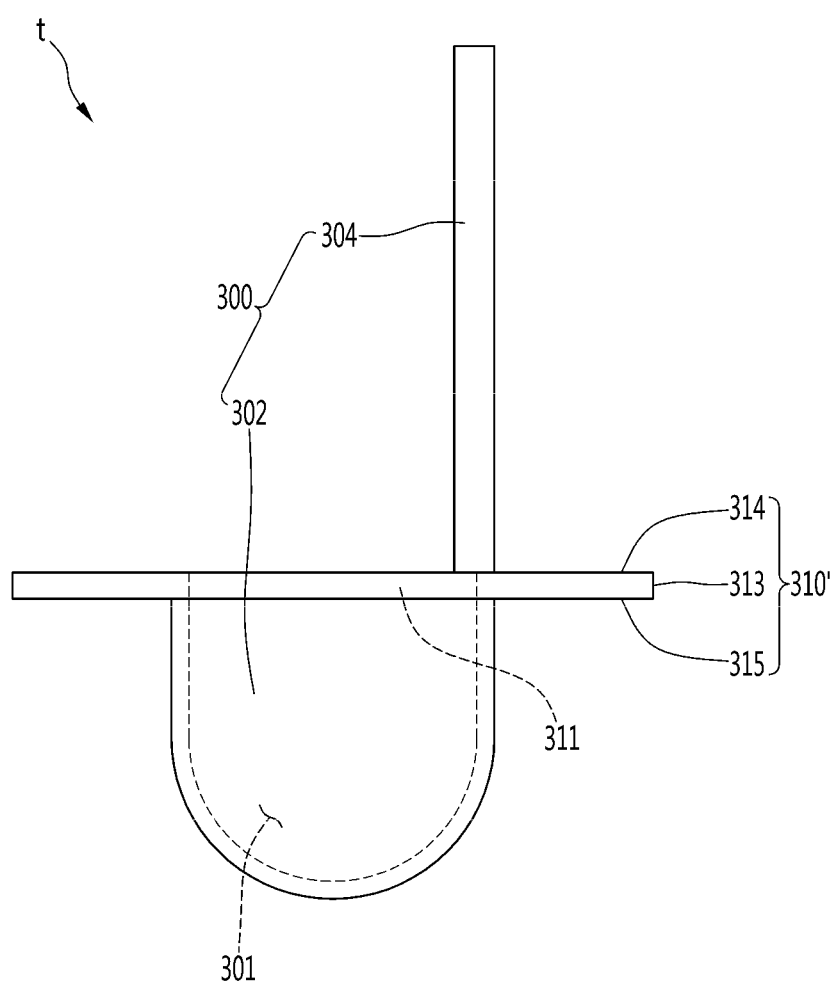
FIG. 16 is a side view of the ladle illustrated in FIG. 14.

FIG. 14 is a plan view illustrating another example of a ladle, according to an embodiment of the present disclosure, FIG. 15 is a cross-sectional view taken along line A-A illustrated in FIG. 14, and FIG. 16 is a side view of the ladle illustrated in FIG. 14.

Figure 17:
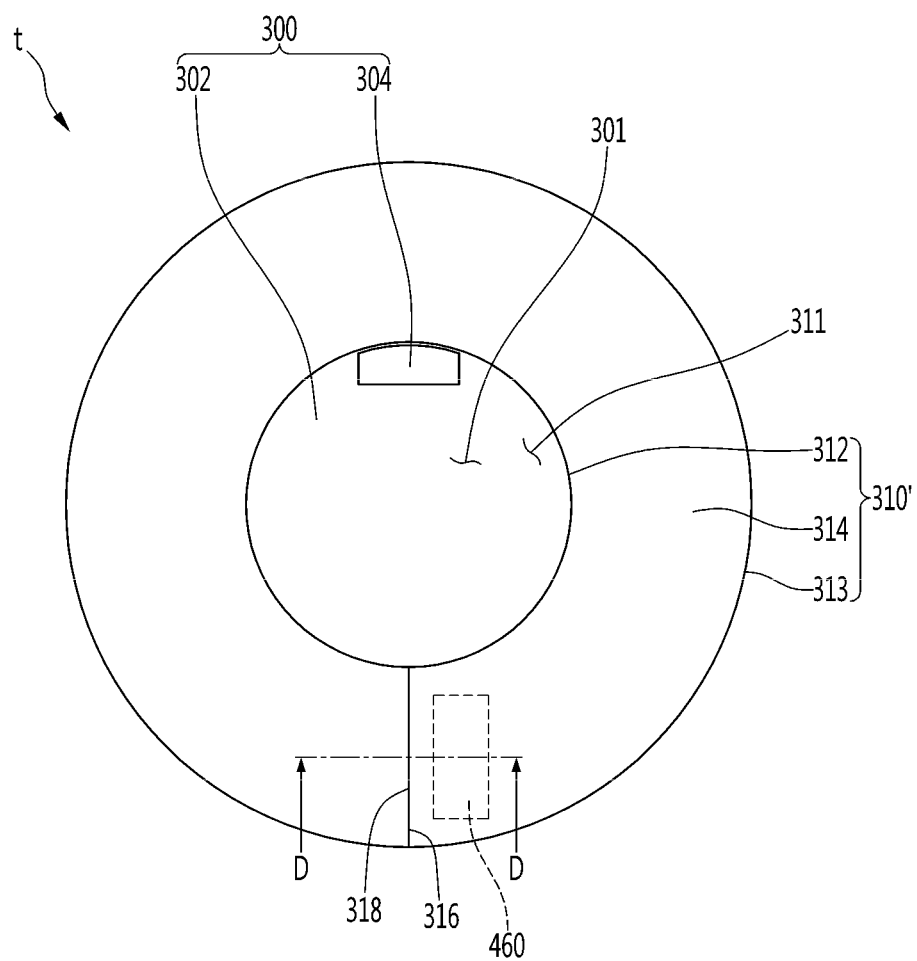
FIG. 17 is a plan view illustrating the modification of the ladle illustrated in FIG. 14 to minimize the overflow of the food.
Figure 18:
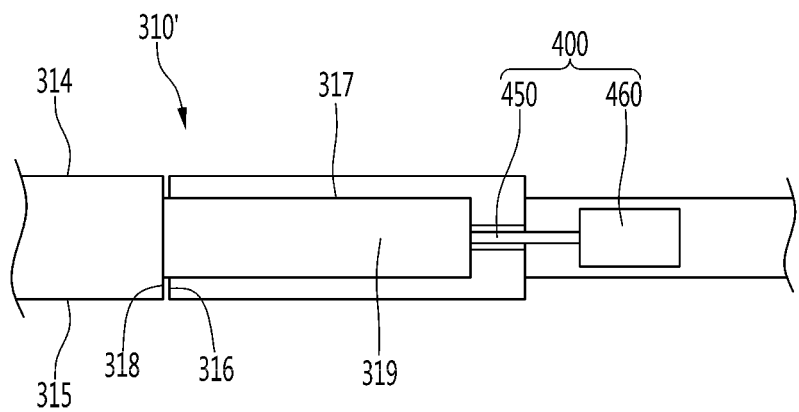
FIG. 18 is a sectional view taken along line D-D illustrated in FIG. 17.
Figure 19:
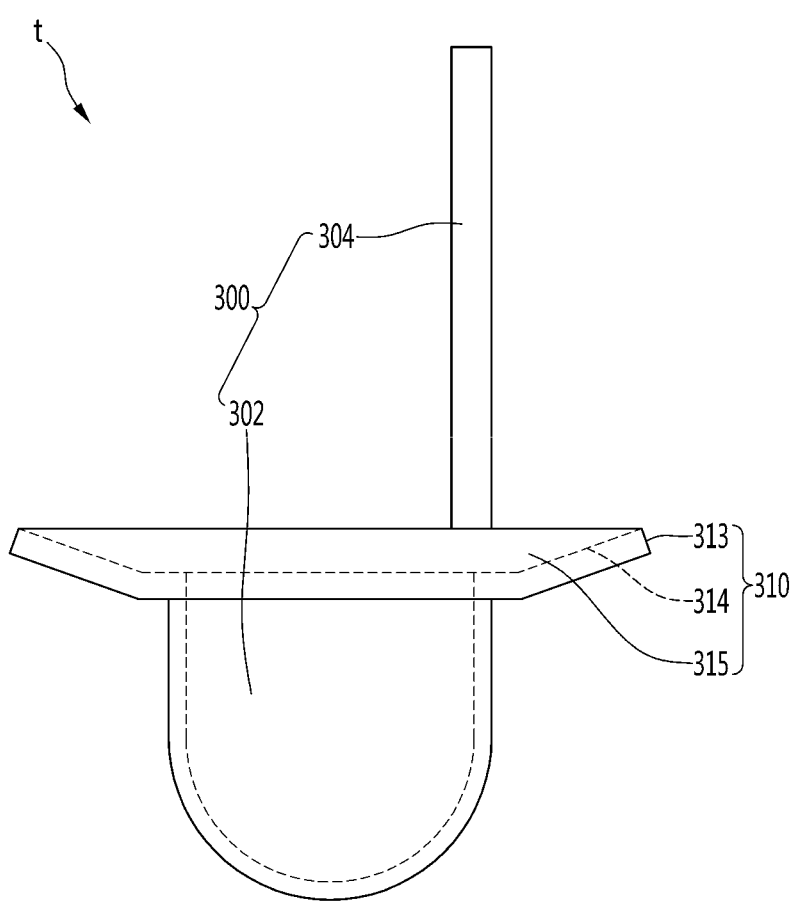
FIG. 19 is a side view of the ladle illustrated in FIG. 17.

FIG. 17 is a plan view when the ladle illustrated in FIG. 14 is changed in shape such that the overflow of the food is minimized, FIG. 18 is a cross-sectional view taken along line B-B illustrated in FIG. 17, and FIG. 19 is a side view of the ladle illustrated in FIG. 17.

A flexible guide 310' of the ladle "t" illustrated in FIGS. 14 to 19 may be formed in one side 316 thereof with an insertion groove 317 and may be formed on an opposite side 318 thereof with a protrusion 319 to be inserted into the insertion groove 317.

Regarding the sectional shape of the flexible guide 310' illustrated in FIGS. 14 to 16, when there is absent external force, the sectional shape of the flexible guide 310' may be a major arc shape, and the one side 316 and the opposite side 318 may be in the shapes of stripes separated from each other as illustrated in FIG. 14.

The shape of the flexible guide 310' may be changed to be the shape of a funnel as illustrated in FIG. 19 when the protrusion 319 is inserted into the insertion groove 317, or the shape thereof may be maintained.

The deformer 400 may pull the protrusion 319 such that the protrusion 319 is inserted into the insertion groove 317. For example, the deformer 400 may include a connecting rod 450 connected with the protrusion 319, and a motor 460 to pull the connecting rod 450 in a direction that the protrusion 319 is inserted into the insertion groove 317.

The connecting rod 450 may be formed of a material which is bendable like a wire. As long as the connecting rod 450 pulls the protrusion 319, various modifications are possible.

Since the ladle "t" illustrated in FIGS. 14 to 19 is the same as or similar to the ladle "t" illustrated in FIGS. 8 to 13 in other components and the operations in addition to the insertion groove 317, the protrusion 319, and the deformer 400, the duplicated details will be omitted.

When the ladle "t" is moved, the controller 180 may drive the motor 460, the flexible guide 310' may be changed to be in the shape of a funnel gradually widened upward as illustrated in FIG. 19.

When the movement of the ladle "t" by the end effector 260 is completed, the controller 180 may drive the motor 460 in a direction reverse to the direction that the ladle "t" is moved, such that the food is easily escaped from the ladle "t", and the flexible guide 310' may be recovered to the shape before the shape of the flexible guide 310'

Figure 20:
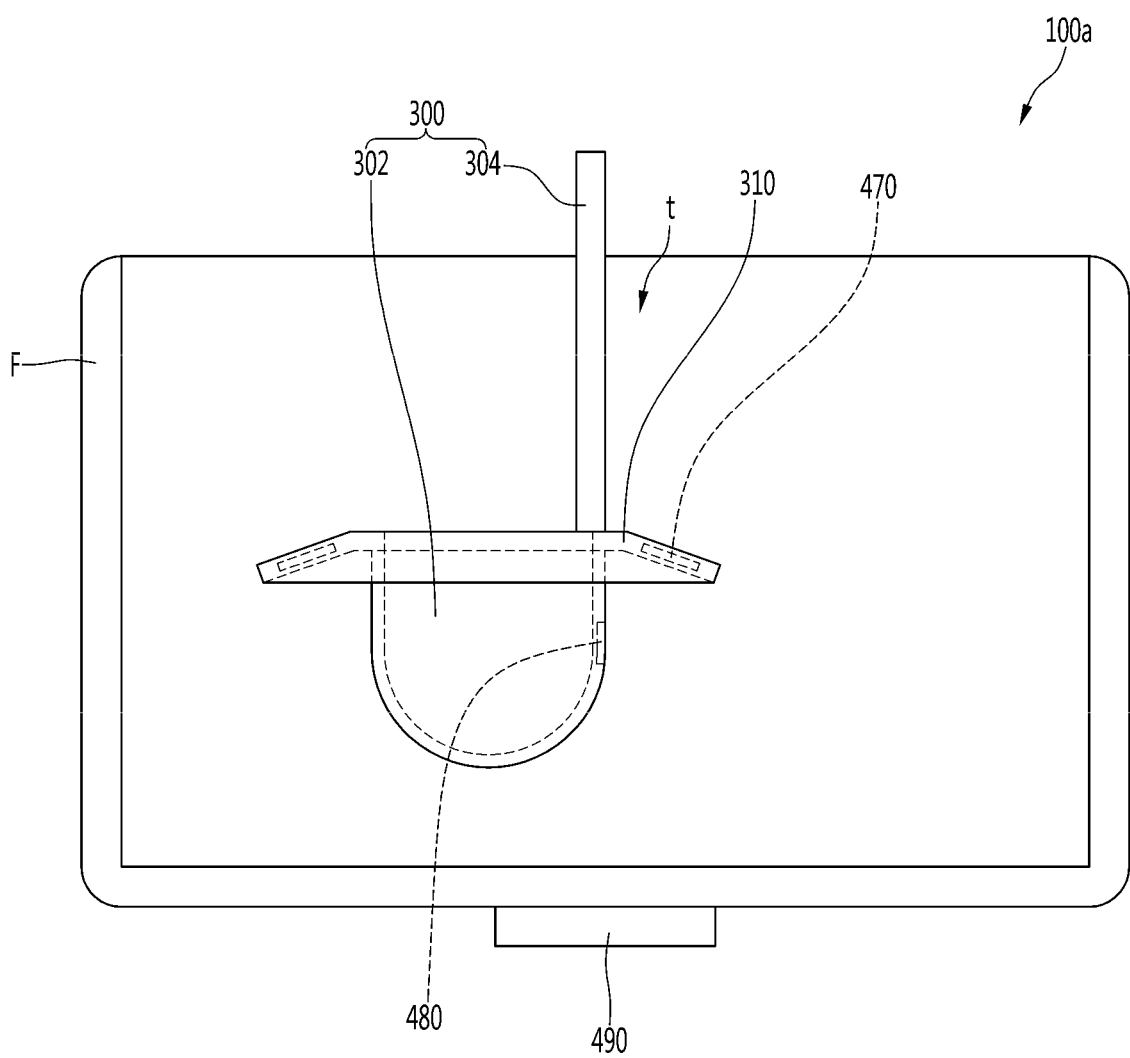
FIG. 20 is a view illustrating the modification of the robot having a ladle, according to an embodiment of the present disclosure.
Figure 21:
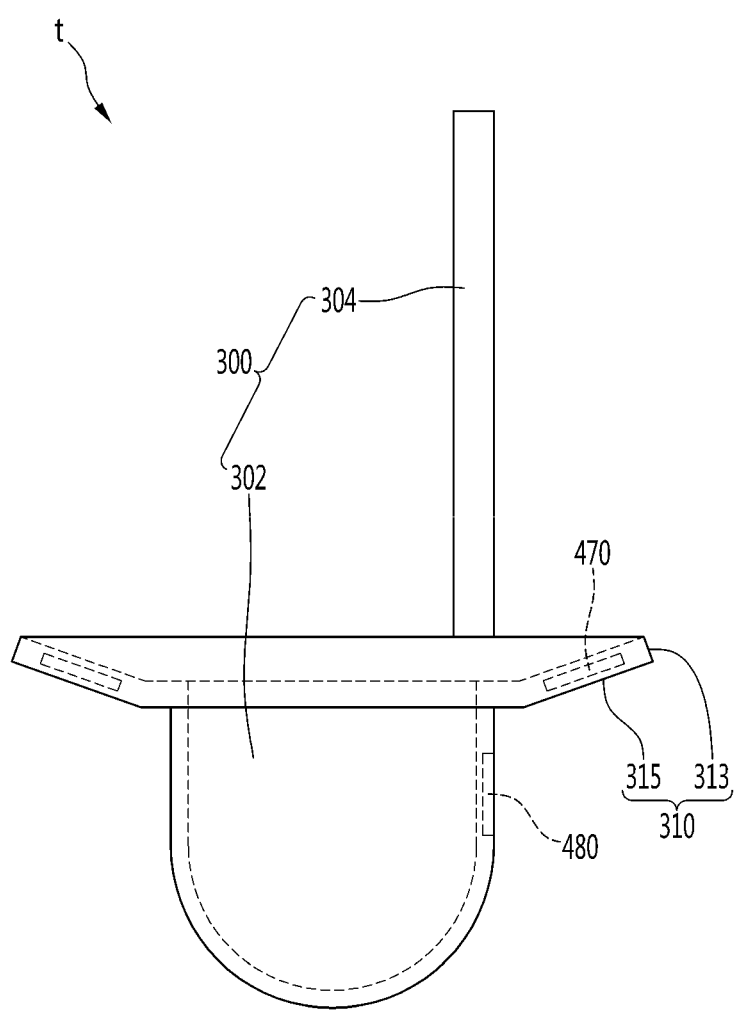
FIG. 21 is a plan view illustrating the modification of the ladle illustrated in FIG. 20 to minimize the overflow of the food.

FIG. 20 is a view illustrating the modification of a robot having the ladle according to an embodiment of the present disclosure, and FIG. 21 is a plan view illustrating the modification of the ladle, which is illustrated in FIG. 20, to minimize the overflow of the food The robot according to the present embodiment may further include the cooking container "F" having a cooking space formed therein in addition to the ladle "t" moving by the robot arm 200.

The cooking container "F" may be a container such as a pot.

The deformer 400 may include a permanent magnet 470 installed in the flexible guide 310 and an electromagnet 490 installed in the cooking container "F" to exert attraction force or repulsive force on the permanent magnet 470.

The ladle "t" may be inserted into the cooking container "F" such as a pot, the permanent magnet 470 installed in the flexible guide 310 of the ladle "t" may be pulled downward by the electromagnet 490 installed in the cooking container "F". The flexible guide 310 may be changed to be in the shape of being gradually widened downward while surrounding the outer circumference of the main body 302 as illustrated in FIG. 20.

When the ladle "t" is withdrawn out of the cooking container "F", such as a pot, the flexible guide 310 may be changed the shape of preventing the overflow of the food in the main body 302.

To this end, the pair of permanent magnets 470 and 480 may be provided in the ladle "t", one of the pair of permanent magnets 470 and 480 may be installed in the flexible guide 310, and a remaining one of the pair of permanent magnets 470 and 480 may be installed in the main body 302 or the grip 304.

The pair of permanent magnets 470 and 480 may be disposed such that the flexible guide 310 is changed to be in the shape of being gradually widened upward like the shape of the funnel, when the external force is not exerted on the flexible guide 310.

For example, when any one of the pair of permanent magnets 470 and 480 is installed in the flexible guide 310, and a remaining one of the pair of permanent magnets 470 and 480 is installed in the main body 302, the permanent magnet 480 may be installed in the main body 302 in a direction of applying repulsive force to the permanent magnet 470 installed in the flexible guide 310.

For another example, when any one of the pair of permanent magnets 470 and 480 is installed in the flexible guide 310, and a remaining one of the pair of permanent magnets 470 and 480 is installed in the handle 304, the permanent magnet 480 may be installed in the handle 304 in a direction of applying attraction force is to the permanent magnet 470 installed in the flexible guide 310.

According to an embodiment of the present disclosure, when the food is carried, the shape of the flexible guide is changed by the deformer, so the flexible guide minimizes the overflow of the food.

In addition, as the flexible guide is formed therein with a space for positioning the food, an amount of food to be carried by the ladle may be increased and the ladle may rapidly move a great amount of food.

In addition, when the food is moved to an inner part of the ladle or the food in the ladle is moved to the outside, the flexible guide may be changed to be in the shape of allowing the inflow or the outflow of the food. Accordingly, the inflow or the outflow of the food may be easily performed, and the food may be more rapidly moved.

The foregoing description is merely illustrative of the technical idea of the present disclosure and various changes and modifications may be made by those skilled in the art without departing from the essential characteristics of the present disclosure.

Therefore, the embodiments disclosed in the present disclosure are intended to illustrate rather than limit the technical idea of the present disclosure, and the scope of the technical idea of the present disclosure is not limited by these embodiments.

The scope of protection of the present disclosure should be construed according to the following claims, and all technical ideas falling within the equivalent scope to the scope of protection should be construed as falling within the scope of the present disclosure.

What is claimed is:

1. A ladle comprising:
   a ladle body including a main body having a handle and a space for containing food;
   a flexible guide having a connection end connected with an upper portion of the main body; and
   a deformer to change a shape of the flexible guide such that an angle of a top surface of the flexible guide is varied,
   wherein the angle is defined between a horizontal plane extending from an upper end of the main body and the top surface of the flexible guide.

2. The ladle of claim 1, wherein the flexible guide has a shape of a disc formed in a center thereof with an opening, and
   wherein the deformer changes the shape of the flexible guide to a funnel shape in which the flexible guide is widened toward an upper portion of the flexible guide, when the deformer is turned on.

3. The ladle of claim 2, wherein, when the deformer is turned on, the top surface of the flexible guide faces above the upper end of the main body.

4. The ladle of claim 1, wherein the deformer includes a permanent magnet installed in the flexible guide.

5. The ladle of claim 4, wherein the deformer further includes:
   an electromagnet installed in the handle or the main body to exert attraction force or repulsive force on the permanent magnet.

6. The ladle of claim 1, wherein the former includes:
   a pair of electromagnets that are provided to the flexible guide while being spaced apart from each other and overlapped with each other while interposing the flexible guide therebetween when the pair of electromagnets are turned on.

7. The ladle of claim 6, wherein the flexible guide includes:
   a pair of electromagnet installations areas in which the pair of electromagnets are installed; and
   a folding area positioned between the pair of electromagnet installation areas and folded while being overlapped with each of the pair of electromagnet installation areas when the pair of electromagnets are turned on.

8. The ladle of claim 1, wherein the flexible guide is formed in one side thereof with an insertion groove and formed on an opposite side thereof with a protrusion inserted into the insertion groove.

9. The ladle of claim 8, wherein the flexible guide has a section in a major arc.

10. The ladle of claim 8, wherein the deformer further includes:
    a connecting rod connected with the protrusion; and
    a motor to pull the connecting rod in a direction that the protrusion is inserted into the insertion groove.

11. The ladle of claim 1, wherein the deformer changes the shape of the flexible guide to a shape in which the angle of the top surface of the flexible guide forms an acute angle with respect to the horizontal plane.

12. A robot comprising:
a ladle including a ladle body including a main body having a handle and a space for containing food and a flexible guide having a connection end connected with an upper portion of the main body;
a deformer to change a shape of the flexible guide such that an angle between a top surface of the flexible guide and an upper end of the main body is varied;
a robot arm including an end effector, which grips the ladle, to move the end effector; and
a controller to control the deformer and the robot arm.

13. The robot of claim 12, wherein the flexible guide has a shape of a disc formed in a center thereof with an opening, and
wherein the deformer changes the shape of the flexible guide to a funnel shape in which the flexible guide is widened toward an upper portion of the flexible guide, when the deformer is turned on.

14. The robot of claim 12, wherein the deformer includes a permanent magnet installed in the flexible guide.

15. The robot of claim 14, wherein the deformer further includes:
an electromagnet installed in the handle or the main body to exert attraction force or repulsive force on the permanent magnet.

16. The robot of claim 12, wherein the deformer includes:
a pair of electromagnets that are provided to the flexible guide while being spaced apart from each other and overlapped with each other while interposing the flexible guide therebetween when the pair of electromagnets are turned on.

17. The robot of claim 12, wherein the flexible guide is formed in one side thereof with an insertion groove and formed on an opposite side thereof with a protrusion inserted into the insertion groove.

18. The robot of claim 17, further comprising:
a connecting rod connected with the protrusion; and
a motor to pull the connecting rod in a direction that the protrusion is inserted into the insertion groove.

19. The robot of claim 12, wherein the deformer includes:
a permanent magnet installed in the flexible guide; and
an electromagnet installed in a cooking container formed therein with a cooking space to exert attraction force or repulsive force to the permanent magnet.

20. The robot of claim 12, wherein the controller maintains the deformer to be turned on when the end effector of the robot arm moves.

* * * * *